(12) United States Patent
Cao et al.

(10) Patent No.: US 8,896,249 B2
(45) Date of Patent: Nov. 25, 2014

(54) METHOD OF POSITION SENSORLESS CONTROL OF AN ELECTRICAL MACHINE

(75) Inventors: Shu Yu Cao, Singapore (SG); Bing Li, Singapore (SG); Anshuman Tripathi, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 192 days.

(21) Appl. No.: 13/560,494

(22) Filed: Jul. 27, 2012

(65) Prior Publication Data

US 2013/0049661 A1   Feb. 28, 2013

Related U.S. Application Data

(60) Provisional application No. 61/512,438, filed on Jul. 28, 2011.

(30) Foreign Application Priority Data

Jul. 28, 2011   (DK) .................................. 2011 70415

(51) Int. Cl.
H02P 6/18 (2006.01)

(52) U.S. Cl.
USPC ................... 318/400.34; 318/268; 318/400.3; 318/609

(58) Field of Classification Search
USPC .................. 318/400.34, 268, 609, 727, 400.3
See application file for complete search history.

(56) References Cited

U.S. PATENT DOCUMENTS

| | | | |
|---|---|---|---|
| 6,163,127 A | 12/2000 | Patel et al. | |
| 6,528,966 B2 * | 3/2003 | Na | 318/727 |
| 6,577,096 B2 * | 6/2003 | Cho | 318/727 |
| 7,501,776 B2 * | 3/2009 | Lee et al. | 318/268 |
| 2005/0110450 A1 * | 5/2005 | Stancu et al. | 318/609 |
| 2007/0257626 A1 * | 11/2007 | Lee et al. | 318/268 |
| 2009/0030645 A1 | 1/2009 | Gotz et al. | |
| 2010/0109584 A1 | 5/2010 | Kwon et al. | |
| 2011/0062902 A1 | 3/2011 | Patel et al. | |

FOREIGN PATENT DOCUMENTS

| | | |
|---|---|---|
| EP | 1492224 A1 | 12/2004 |
| EP | 1653601 A1 | 5/2006 |
| WO | 2010023285 A1 | 3/2010 |

OTHER PUBLICATIONS

Andreescu et al. "Combined Flux Observer with Signal Injection Enhancement for Wide Speed Range Sensorless Direct Torque Control of IPMSM Drives", IEEE Transactions on Energy Conversion, Jun. 2008, vol. 23, No. 2, pp. 393-402.
Search Report of Danish Patent Application PA 2011 70414 dated Mar. 6, 2012.
Search Report of Danish Patent Application PA 2011 70415 dated Mar. 6, 2012.
Boldea et al. "Active Flux" DTFC-SVM Sensorless Control of IPMSM, IEEE Transactions on Energy Conversion, Jun. 2009, pp. 314-322, vol. 24, No. 2.
Shi et al., "Position Control of an Interior Permanent-Magnet Synchronous Motor Without Using a Shaft Position Sensor", IEEE Transaction on Industrial Electronics, Jun. 2007, pp. 1989-2000, vol. 54, No. 4.
Cao et al., U.S. Appl. No. 13/560,444, filed Jul. 27, 2012.

* cited by examiner

*Primary Examiner* — Paul Ip
(74) *Attorney, Agent, or Firm* — Patterson & Sheridan, LLP (57) ABSTRACT

A position sensorless control methodology for an electrical machine is provided. In particular, one aspect provides a method for position sensorless operation of an electrical machine using direct position error computation from stator flux observation results and stator current measurement.

18 Claims, 8 Drawing Sheets

METHOD OF POSITION SENSORLESS CONTROL OF AN ELECTRICAL MACHINE

FIELD OF THE INVENTION

Embodiments of the present invention relate to a position sensorless control methodology for an electrical machine, in particular determining a rotor position from stator flux observations and stator current measurements.

BACKGROUND OF THE INVENTION

Generally, for most of the known Back Electromotive Force (bemf) model-based Interior Permanent Magnet (IPM) position sensorless control schemes, the rotor position is estimated from the stator voltage and stator current relationship.

Due to the rotor saliency item of an IPM machine, the voltage equation-based bemf model has to be simplified by ignoring some dynamic transition related items. The position accuracy is thus greatly deteriorated in dynamic load transition and dynamic speed transition.

Another common disadvantage of the voltage equation based bemf model methods is that the position accuracy is sensitive to the generator inductance variation, the generator stator resistance variation, and the rotor flux magnitude variation. In practical operation, the generator inductance variation is significant due to magnetic circuit saturation. The generator stator resistance and rotor flux magnitude variation may also be significant due to generator operation temperature change.

DESCRIPTION OF THE INVENTION

Embodiments of the present invention relate to a position sensorless control methodology for an electrical machine.

A first aspect of the invention provides a method for position sensorless control of an electrical machine, the method comprising
  measuring a stator current of the electrical machine,
  determining a stator flux of the electrical machine from the stator current,
  computing a total rotor position error from at least the stator flux and the stator current,
  determining an estimated raw speed signal from the total rotor position error,
  integrating the raw speed signal so as to derive an estimated angular rotor position of a rotor of the electrical machine, and
  applying the estimated angular rotor position to control the electrical machine.

In a second aspect, there is provided a wind turbine comprising an electrical machine, and an apparatus for position sensorless control of the electrical machine, the apparatus being adapted to carry out the methods of the first aspect.

In another aspect, there is provided a computer readable medium having a computer program recorded thereon, computer program comprising instructions which, when executed by a processor, make the processor perform a method for position sensorless control of an electrical machine in a wind turbine according to the methods of the first aspect.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION OF THE INVENTION

Before turning to the detailed description of the drawings, a few more general items of the embodiment will be discussed.

Conventional direct position error computation methods for sensorless control of IPM machines have been developed based on the stator voltage equation in the estimated rotor flux reference frame (denoted as dc/qc reference frame) as:

$$\Delta\theta_c = \tan^{-1}\left[\frac{v_{dc} - (r + pL_d)\cdot i_{dc} + \left\{\begin{array}{c}\omega_1 L_q + \\ (L_d - L_q)(p\Delta\theta)\end{array}\right\}\cdot i_{qc}}{v_{qc} - (r + pL_d)\cdot i_{qc} - \left\{\begin{array}{c}\omega_1 L_q + \\ (L_d - L_q)(p\Delta\theta)\end{array}\right\}\cdot i_{dc}}\right]$$

In implementation, simplification has to be made to ignore the stator current dynamic transition and error in speed estimation so that the position error is computed directly from stator current and stator voltage signals in the estimated rotor reference frame as illustrated below:

Even though this method is simple in implementation, the position accuracy at dynamic load transition deteriorated due to the simplification that is made in position error computation. The performance of this method is sensitive to stator resistance accuracy and speed transition also. The significant saturation effect of stator inductance in Lq for IPM machines has not been taken into account. It has thus been observed that the position accuracy of this method changes significantly with load condition change in steady state operation.

Shaft mounted position encoders reduce the robustness of the wind turbine generator control system due to significant mechanical vibration existing on the turbine driven train. To turn to sensorless operation during a fault condition of the encoder signal is a desirable control feature which enhances the turbine system reliability and availability. Additional cost saving with improved product reliability can also be achieved by starting sensorless operation directly at generator power connection stage and thus eliminating the encoder assembly in the generator shaft.

Certain conventional position sensorless control schemes utilize the model-based bemf estimation method for IPM machines and Surface mounted Permanent Magnet (SPM) machines in medium to high speed operation. It is difficult to achieve accurate position estimation for IPM machine in both steady state operation and dynamic load transition and speed transition due to simplifications made in the IPM bemf model. Significant position estimation error is generated due to generator parameters mismatch in the bemf model which neglects the derivative item of current in bemf estimations. In the worst condition, the position sensorless control may become unstable in dynamic transition of speed and power due to large position and speed estimation errors.

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

A first aspect of the invention provides a method for position sensorless control of an electrical machine, the method comprising
measuring a stator current of the electrical machine,
determining a stator flux of the electrical machine from the stator current,
computing a total rotor position error from at least the stator flux and the stator current,
determining an estimated raw speed signal from the total rotor position error,
integrating the raw speed signal so as to derive an estimated angular rotor position of a rotor of the electrical machine, and
applying the estimated angular rotor position to control the electrical machine.

In an embodiment, the method may further comprise low-pass filtering the raw speed signal in order to reduce ripple. In another embodiment, the filtered speed signal and the estimated angular rotor position are applied in a control algorithm for controlling the electrical machine.

In an embodiment, the electrical machine comprises an interior permanent magnet machine. In another embodiment, the electrical machine comprises a reluctance machine. In yet another embodiment, the permanent magnet machine comprises a surface mounted permanent magnet machine. In an embodiment, the, the electrical machine comprises an electrical generator.

In an embodiment, computing the total rotor position error comprises
computing a stator flux-related position error, and a stator current-related position error,
deriving a speed-dependent offset compensation angle for the position error, and
computing the total rotor position error from the stator flux-related position error, the stator current-related position error and the speed-dependent offset compensation angle.

The flux-related position error may be an angular position error in the estimated rotor flux reference frame with respect to the actual rotor magnetic flux axis from the observed stator flux vector.

In an embodiment, the speed-dependent offset compensation angle is correlated to a range of machine speed settings, from an angle of zero at a low speed level, to a predetermined compensation angle at a high speed level.

In an embodiment, determining the estimated raw speed signal comprises
applying a PI regulator to the total rotor position error so as to derive a speed error, and
low-pass filtering a transition speed signal so as to derive a speed feed forward signal.

Sets of PI regulator gain-values, Kp and Ki, may be stored in a look-up table for different speed levels to account for the non-linearity in position and speed estimation. At low speeds, larger Kp gains and Ki gains are applied. At higher speed levels, the Kp gain and the Ki gain for the position error regulation need to be reduced. During sensorless operation, the Kp gain and the Ki gain are smoothly changed with generator speed by linear-interpolating in accordance with a look-up table containing Kp gain and Ki gain values with respect to the generator speed.

In an embodiment, the transition speed signal is obtained during an initialization as an initial iteration. In another embodiment, the initialization comprises obtaining an initial rotor speed from any of a measurement of stator voltage at an open circuit condition, and an encoder measurement prior to an encoder fault. In yet another embodiment, the initialization further comprises obtaining an initial rotor position.

In an embodiment, a stator inductance is identified and applied to the computing of the total rotor position error. In another embodiment, the stator inductance is identified with a 2-dimensional look-up table based on the stator flux and the stator current.

To improve the accuracy of the estimated position in the angular position error computation the q-axis inductance of the generator may be obtained from linear-interpolation of a two-dimensional look-up which has been established in a bench test.

In an embodiment, determining the stator flux comprises
determining a stator flux from a current mode flux observer,
determining a stator flux from a voltage mode flux observer,
combining the stator flux from the current mode flux observer with the stator flux from the voltage mode flux observer based on a machine rotor speed.

A so-called "minimum ratio of voltage mode observation results" is applied in the total stator flux observation results at low speed so that the sensorless control allows speed ramp up and ramp down at very low speed operation.

In a second aspect, there is provided a wind turbine comprising an electrical machine, and an apparatus for position sensorless control of the electrical machine, the apparatus being adapted to carry out the methods of the first aspect.

In another aspect, there is provided a computer readable medium having a computer program recorded thereon, computer program comprising instructions which, when executed by a processor, make the processor perform a method for position sensorless control of an electrical machine in a wind turbine according to the methods of the first aspect.

The following advantages are associated with the methods according to aspects of the present invention:
1. The position error function is derived directly from the stator flux and stator current linear equation in the estimated rotor flux reference frame without any simplification. The accuracy of position error is decided by the accuracy of generator parameter Lq and the accuracy of stator flux observation.

2. The stator flux observation accuracy at low speed is improved by combination of the voltage mode flux observer and the current mode flux observer. Speed acceleration and deceleration at low speed in sensorless control is ensured by enforcing a minimum ratio of voltage mode flux observation results.
3. The accuracy of Lq is improved with on-bench identified 2-D Lq look-up table.
4. The estimated position signal accuracy is not sensitive to the variation of generator parameter including Ld (d-axis inductance), Rs (stator resistance), and ψ, (rotor flux magnitude). Therefore, the sensorless control has consistent performance with respect to generator temperature variation.
5. The estimated position signal accuracy is not sensitive to the current dynamic response in power ramp up/ramp down process.
6. The estimated position signal accuracy is less sensitive to speed acceleration and speed deceleration by applying the speed feed forward in speed estimation.
7. The transit position error at start of position sensorless control is greatly reduced by applying smooth transition of speed signal with respect to its initial value.
8. The proposed position sensorless control scheme is applicable for both IPM and SPM machines.
9. The proposed position sensorless control scheme is independent of the main IPM/SPM generator control method. It is applicable for both current vector control system and stator flux vector control system.

An advantage for the proposed position sensorless control scheme is that the position and speed accuracy is less sensitive to generator parameter variation and the current transition. The transit position and speed error in speed acceleration and deceleration is minimized by applying the speed feed forward control. The position error at start of sensorless control is minimized by proper initialization of the position and speed estimation and applying smooth speed transition from its initial value.

In the present embodiment, the electrical machine is an interior permanent magnet generator, where permanent magnets are mounted in slots within the rotor of the generator, the rotor designed to rotate about an axis inside a stator of the generator, converting rotational movement energy to electrical energy. In other embodiments, a surface mounted permanent magnet generator or a reluctance permanent magnet-less generator may be used, configured in a similar manner.

In the present embodiment, a wind turbine comprises an interior permanent magnet generator and the permanent magnet generator further comprises a physical position encoder for the measurement of the rotor position. It is foreseen that the sensorless control schemes can begin operation in the wind turbine generator control system if and when the position encoder suffers an operational fault and ceases to provide reliable operation.

Figure 1:
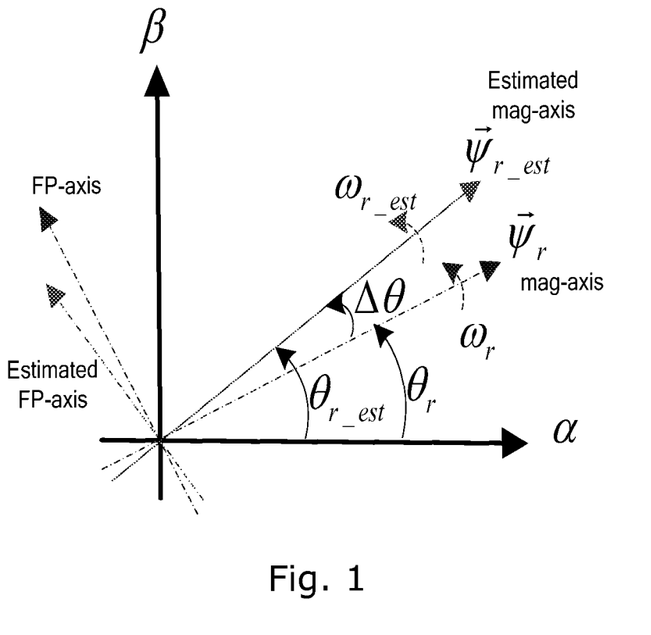
FIG. 1 shows a relationship of the reference frame for an IPM generator.

FIG. 1 illustrates the position angle relationship of an IPM machine in the estimated rotor reference frame. The axis for stator stationary reference frame is denoted as α/β axis. The magnetic-axis is aligned with rotor flux vector $\vec{\psi}_r$ with unknown rotor flux position angle θ, relative to the α-axis and rotating in generator rotor speed $\omega_r$. The estimated mag-axis is aligned with the estimated rotor flux vector $\vec{\psi}_{r\_est}$ which rotating in estimated speed $\omega_{r\_est}$. The estimated rotor position angle $\theta_{r\_est}$ is the angle between the rotor flux vector and α-axis.

In the estimated rotor flux reference frame, the stator flux equation is represented as:

$$\begin{bmatrix} \psi_{mag\_est} \\ \psi_{FP\_est} \end{bmatrix} = \begin{bmatrix} L_{avg} + L_{diff} * \cos(2*\Delta\theta) & -L_{diff} * \sin(2*\Delta\theta) \\ -L_{diff} * \sin(2*\Delta\theta) & L_{avg} - L_{diff} * \cos(2*\Delta\theta) \end{bmatrix} * \begin{bmatrix} i_{mag\_est} \\ i_{FP\_est} \end{bmatrix} + \psi_r * \begin{bmatrix} \cos\Delta\theta \\ -\sin\Delta\theta \end{bmatrix}$$

Where $$L_{avg} = \frac{L_d + L_q}{2}, L_{diff} = \frac{L_d - L_q}{2},$$

and Ld and Lq are corresponding stator inductance in rotor flux reference frame.

Eliminating the rotor flux from the above stator flux equation, the following relationship is obtained:

$\psi_{mag\_est}*\sin\Delta\theta - L_{avg}*i_{mag\_est}*\sin\Delta\theta - L_{diff}*$
$\cos(2*\Delta\theta)*\sin\Delta\theta*i_{mag\_est} + L_{diff}*\sin(2*\Delta\theta)*$
$\sin\Delta\theta*i_{FP\_est} = -\psi_{FP\_est}*\cos\Delta\theta - L_{diff}*$
$\sin(2*\Delta\theta)*\cos\Delta\theta*i_{mag\_est} + L_{avg}*i_{FP\_est}*$
$\cos\Delta\theta - L_{diff}*\cos(2*\Delta\theta)*\cos\Delta\theta*i_{FP\_est}$ Utilizing the trigonometric identities, the following relationship is obtained:

$$\psi_{mag\_est} * \sin\Delta\theta - L_{avg} * i_{mag\_est} * \sin\Delta\theta -$$
$$L_{diff} * \frac{\sin(3*\Delta\theta) - \sin\Delta\theta}{2} * i_{mag\_est} + L_{diff} * \frac{\cos\Delta\theta - \cos 3*\Delta\theta}{2} * i_{FP\_est} =$$
$$-\psi_{FP\_est} * \cos\Delta\theta - L_{diff} * \frac{\sin(3*\Delta\theta) + \sin\Delta\theta}{2} * i_{mag\_est} +$$
$$L_{avg} * i_{FP\_est} * \cos\Delta\theta - L_{diff} * \frac{\cos\Delta\theta + \cos 3*\Delta\theta}{2} * i_{FP\_est}$$

Re-grouping the items, the position error function can be directly computed as:

$$g(\Delta\theta) = \tan\Delta\theta = \frac{\sin\Delta\theta}{\cos\Delta\theta} = \frac{-\psi_{FP\_est} + (L_{avg} - L_{diff}) * i_{FP\_est}}{\psi_{mag\_est} - (L_{avg} - L_{diff}) * i_{mag\_est}} = \frac{-\psi_{FP\_est} + L_q * i_{FP\_est}}{\psi_{mag\_est} - L_q * i_{mag\_est}}$$

The above position error function is derived from 1PM machine, but it is also applicable for SPM machines.

Figure 2A:
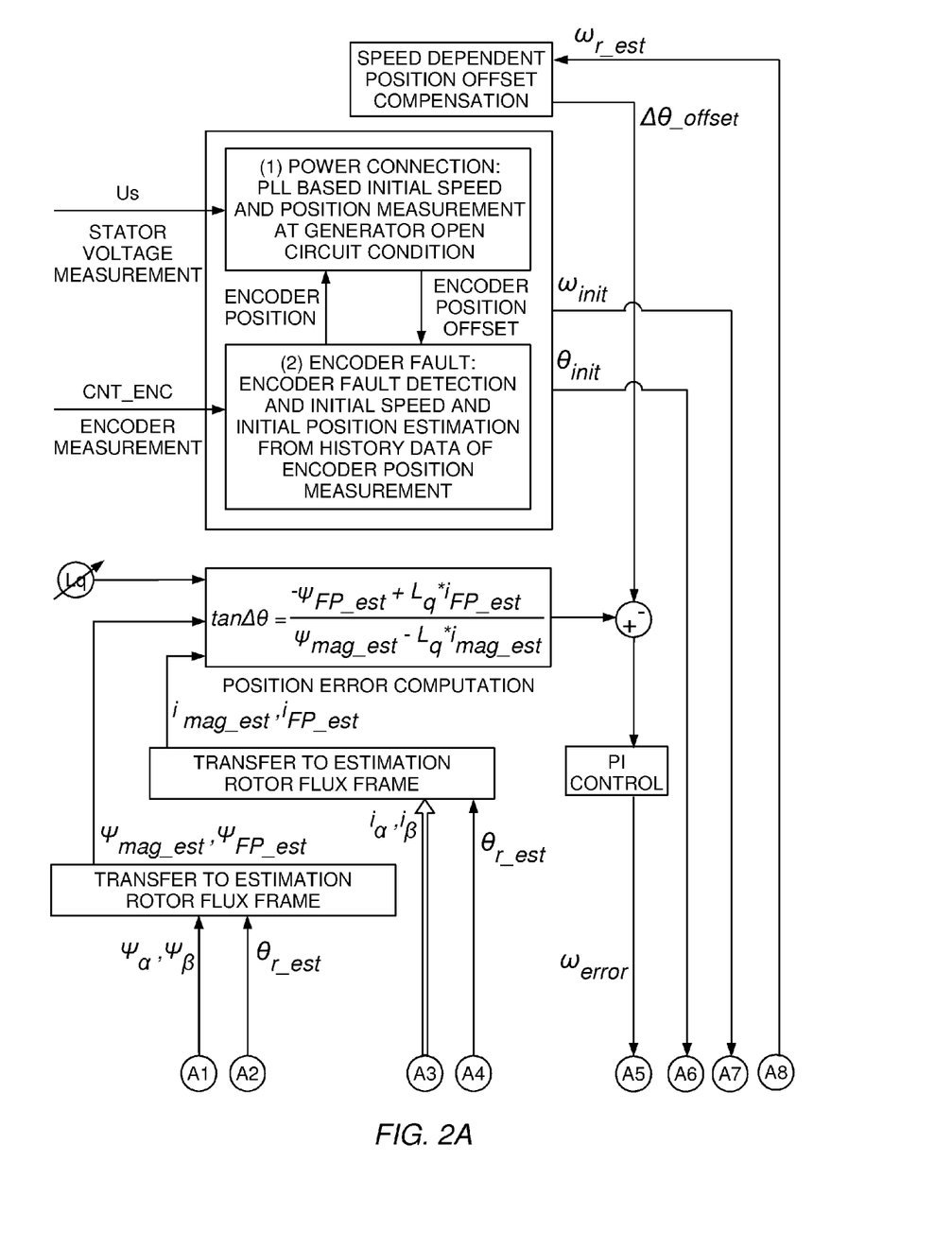
FIGS. 2A and 2B show a position and speed estimation scheme.
Figure 2B:
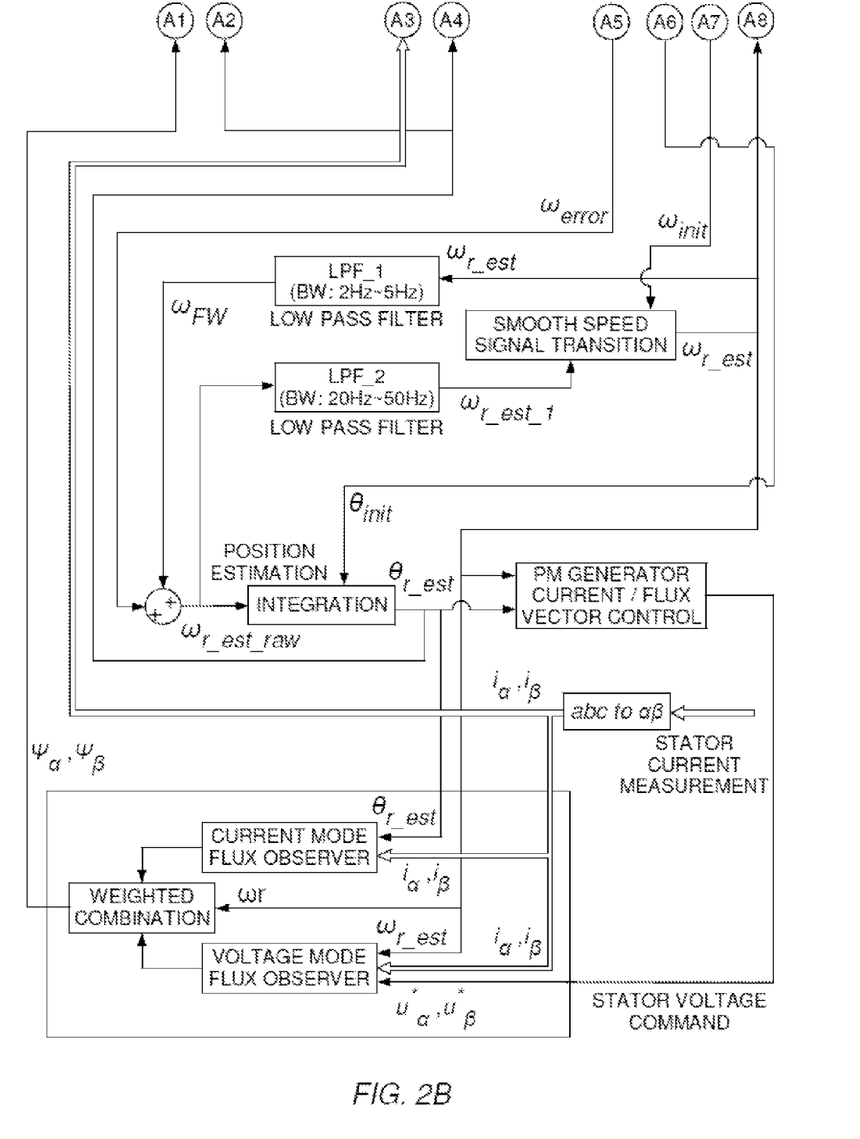

FIGS. 2A and 2B illustrate the position and speed estimation method for sensorless position control of IPM/SPM generator.

Certain features implemented in an embodiment of the position and speed estimation are listed below.

1) A speed-dependent combination of voltage mode flux observation results and current flux observation results with a minimum ratio of voltage mode observation results applied in low speed range.

If speed > speed_VM
    $K_{VM}$=1
else
{
    $K_{VM}$=(speed−speed_CM)/(speed_VM−speed_CM)
    If ($K_{VM} < K_{VM\_min}$)

-continued $$K_{VM} = K_{VM\_min}$$
}
$$\psi_\alpha = (1 - K_{VM}) * \psi_{\alpha\_CM} + K_{VM} * \psi_{\alpha\_VM}$$
$$\psi_\beta = (1 - K_{VM}) * \psi_{\beta\_CM} + K_{VM} * \psi_{\beta\_CM}$$

Where, speed_CM is the speed level to fully apply voltage mode flux observation results, speed_CM is the speed level to fully apply the current mode flux observation results, $K_{VM}$ is the ratio of voltage mode observation results applied, and $K_{VM\_min}$ is the minimum ratio of the voltage mode observation results applied at low speed operation which is set to around 0.1~0.05.

2) The position error function computation from observed flux and measured current in the estimated rotor flux reference frame.

$$\Delta\theta_1 \approx \tan\Delta\theta = \frac{-\psi_{FP\_est} + L_q * i_{FP\_est}}{\psi_{mag\_est} - L_q * i_{mag\_est}}.$$

3) Speed-dependent position error compensation to reduce the steady state position error.

$$\Delta\theta = \Delta\theta_1 + \theta_{offset} * \frac{speed\_limited - speed\_low}{speed\_high - speed\_low}$$

Where, speed_limited is the generator speed limited in a certain range with speed_high as the high speed level at which the compensation angle equals $\theta_{offset}$ and speed_low as the low speed level at which the compensation angle equals zero.

If (speed >= speed_high)
    Speed_limited=speed_high
else if (speed <= speed_low)
    speed_limited=speed_low
else speed_limited=speed 4) Speed error signal generation based on PI regulation of position error signal.

$$\omega_{r\_error} = K_p * \Delta\theta + K_i * \int(\Delta\theta)dt$$

At low speed operation, larger Kp gain and Ki gain is preferred to provide sufficient reduction of low frequency component of the position error signal.

At high speed operation, smaller Kp gain and Ki gain is preferred to reduce the sensitivity to the noise included in the position error signal.

Therefore, a speed-dependent Kp gain and Ki gain look-up table is implemented to provide stable sensorless operation at the full speed range.

1-dimensional (1-D) linear interpolation of the Kp(speed) loop-up table and Ki(speed) look-up table is applied in the sensorless control operation.

5) Speed feed forward signal $\omega_{FW}$ generation by low pass filtering (LPF_1) of the speed signal $\omega_r$ applied in the generator control. The low pass filter bandwidth is set to around 2 Hz to 5 Hz $$\omega_{FW} = LPF\_1(\omega_{r\_est})$$

6) Position signal generation by integration of the estimated speed signal $$\theta_{r\_est} = \theta_{r\_init} + \int(\omega_{r\_error} + \omega_{FW})dt$$

If the sensorless control starts at encoder fault condition, the position measurement before encoder fault is used as the signal to initialize the speed estimation, i.e. $\theta_{r\_init} = \theta_{r\_ENC}$.

If the sensorless control starts at power connection stage at the instant when PWM is turned on, the initial position is obtained from phase locked loop tracking control of the electrical phase position of generator's three line-to-line voltage $US_{12}$, $US_{23}$, $US_{31}$ considering the line-to-phase 30° advance considered, i.e. $\theta_{r\_init} = \theta_{r\_US\_PLL}$.

7) Speed signal initialization and smooth transition for generator control.

The estimated speed signal is obtained from the sum of the speed error signal and speed feed forward signal. To minimize the effect speed ripple, the estimated speed signal applied in the generator control is low pass filtered as below with the low pass filter bandwidth set to around 20 Hz to 50 Hz.

$$\omega_{r\_est\_1} = LPF\_2(\omega_{error} + \omega_{FW})$$

If the sensorless control starts at encoder fault condition, the initial speed for generator control is derived from encoder measurement before encoder fault $\omega_{r\_init} = \omega_{r\_ENC}$.

If the sensorless control starts power connection stage, the initial speed for generator control is obtained from the phase locked loop tracking control of the generator line voltage (denoted as $US_{12}$, $US_{23}$, $US_{31}$) in the open circuit condition before PWM is switched on.

$$\omega_{r\_init} = \omega_{r\_US\_PLL}.$$

To minimize the transit position error at start of sensorless control, the initial speed signal is applied in the generator control for some time. Afterwhich, the speed signal for generator control smoothly transits to the estimated speed signal for sensorless operation.

If the time for sensorless operation (T_sensorless) is less than the speed transition starting time (T_speed_transit_start), the initial speed is applied in the power generation control as below.

$$\omega_{r\_est} = \omega_{r\_init}$$

If the time for sensorless operation is greater than the speed transition starting time (T_speed_transit_start) but less than the speed transition ending time (T_speed_transit_end), the ratio for initial speed and the estimated speed is computed as below. The output for estimated speed applied in the generator control $\omega_{r\_est}$ slowly transfers from the initial speed $\omega_{r\_init}$ to the estimated speed $\omega_{r\_est\_1}$.

$$K\_speed = \frac{T\_speed\_transit\_end - T\_sensorless}{T\_speed\_transit\_end - T\_speed\_transit\_start}$$

$$\omega_{r\_est} = K\_speed * \omega_{r\_init} + (1 - K\_speed) * \omega_{r\_est\_1}$$

If the time for sensorless operation is greater than the speed transition ending time (T_speed_transit_end), the speed applied in the generator control is from the position error regulation output as below $$\omega_{r\_est} = \omega_{r\_est\_1}$$

8) Improvement of position error computation accuracy with 2-dimensional look-up table based Lq profile identified on bench test with encoder position signal applied in the generator control.

To minimize the effects of magnetic circuit saturation on accuracy of sensorless control, the on-bench identified Lq profile is applied for position sensorless control.

From bench measurement, significant cross-saturation effect from d-axis current to q-axis inductance has been observed, it is required to implement 2-dimensional (2-D) stator inductance identification for Lq (i_FP, i_s_Mag) profile identification. The derivatives of flux and current are used to compute the Lq profile. The method for Lq profile identification is to inject a sinusoidal testing signal in the flux reference signal and the sinusoidal responses on the observed flux and measured current are applied to build the 2-D look-up table. Mathematically, the Lq value at a set of "is_mag" and "is_FP" testing current level is represented as below.

$$L_q(i_{s\_mag} = \text{IS\_mag\_Test}, i_{s\_FP} = \text{IS\_FP\_Test}) = \frac{\partial \psi_{s\_FP}}{\partial i_{s\_FP}} = \frac{\psi_{FP\_sine\_response}}{i_{FP\_sine\_response}}$$

A prior patent application, PCT/DK2011/050241, has been filed by the present applicants on a method of determining the inductance profile of an electrical machine, in particular an interior permanent magnet generator, and is incorporated entirely by reference in this application. The method can similarly be used for other types of electrical machines.

In the position sensorless operation, 2-D linear-interpolation is applied to obtain the correct Lq value according to the measured magnetization current level (IS_MAG) and the field power current level (IS_FP).

The performance of position and speed estimation scheme proposed is independent of the main generator control method and can be applied for either the stator current control system or the stator flux control system.

Figure 3A:
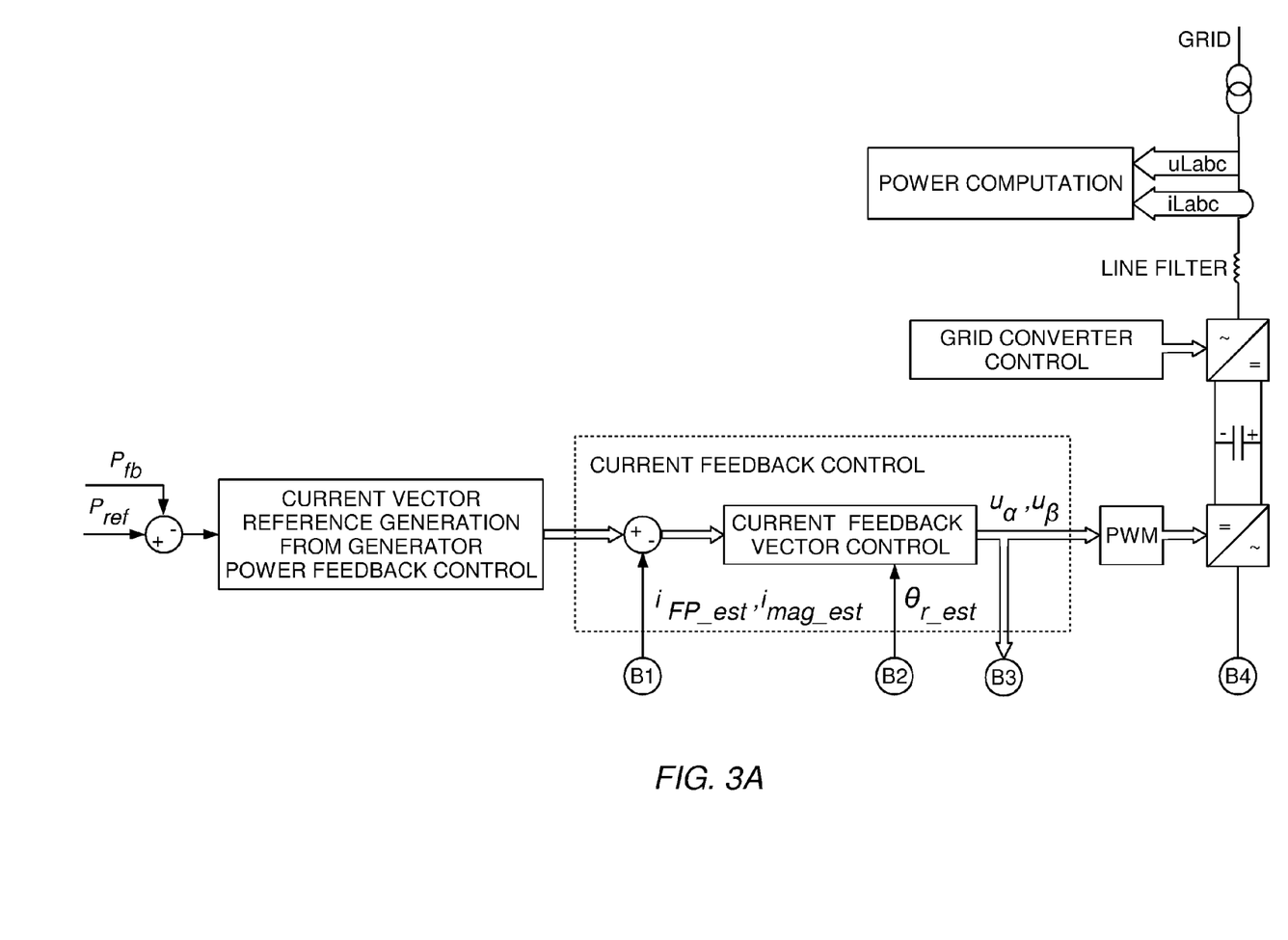
FIGS. 3A and 3B illustrate a sensorless position control scheme applied in a current vector control system.
Figure 3B:
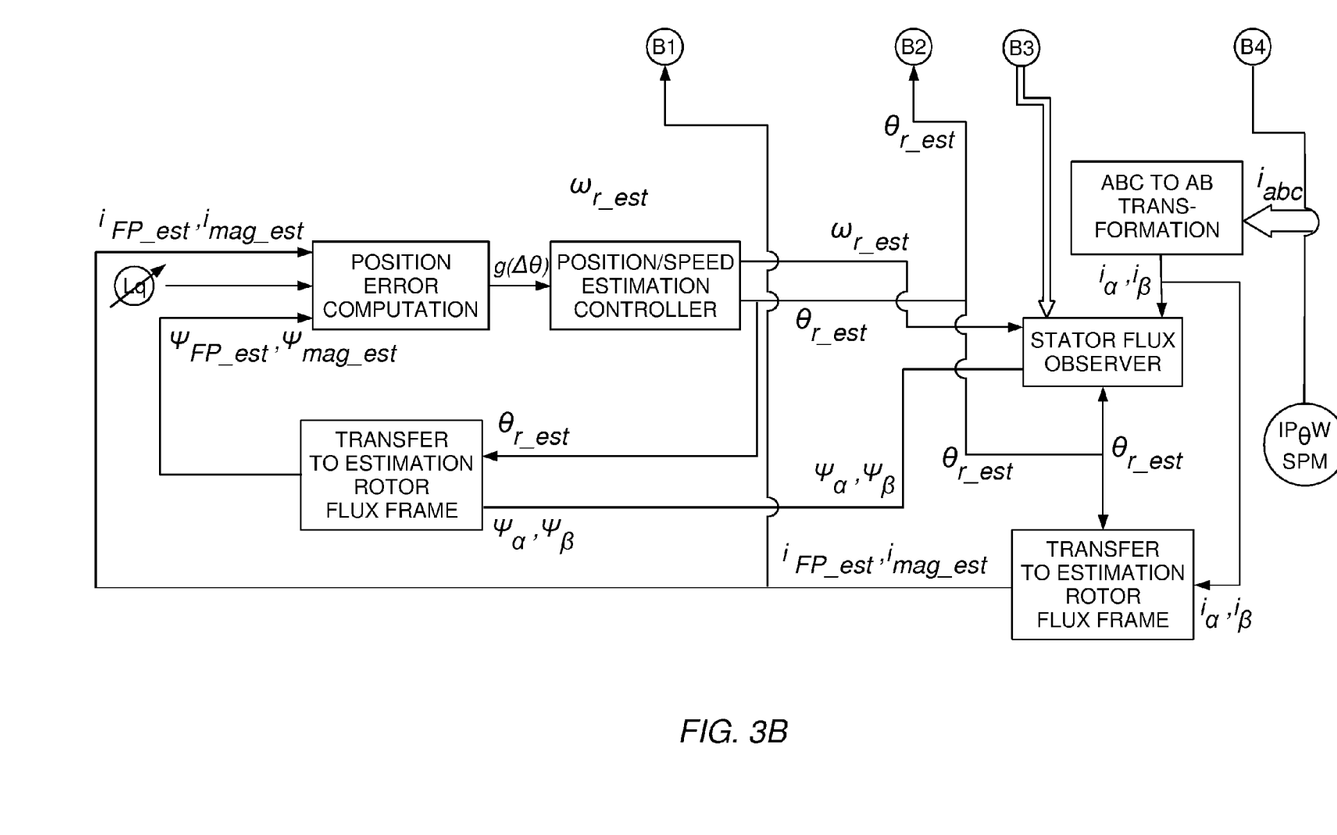

FIGS. 3A and 3B illustrate the sensorless position control scheme in a current feedback control system.

Figure 4A:
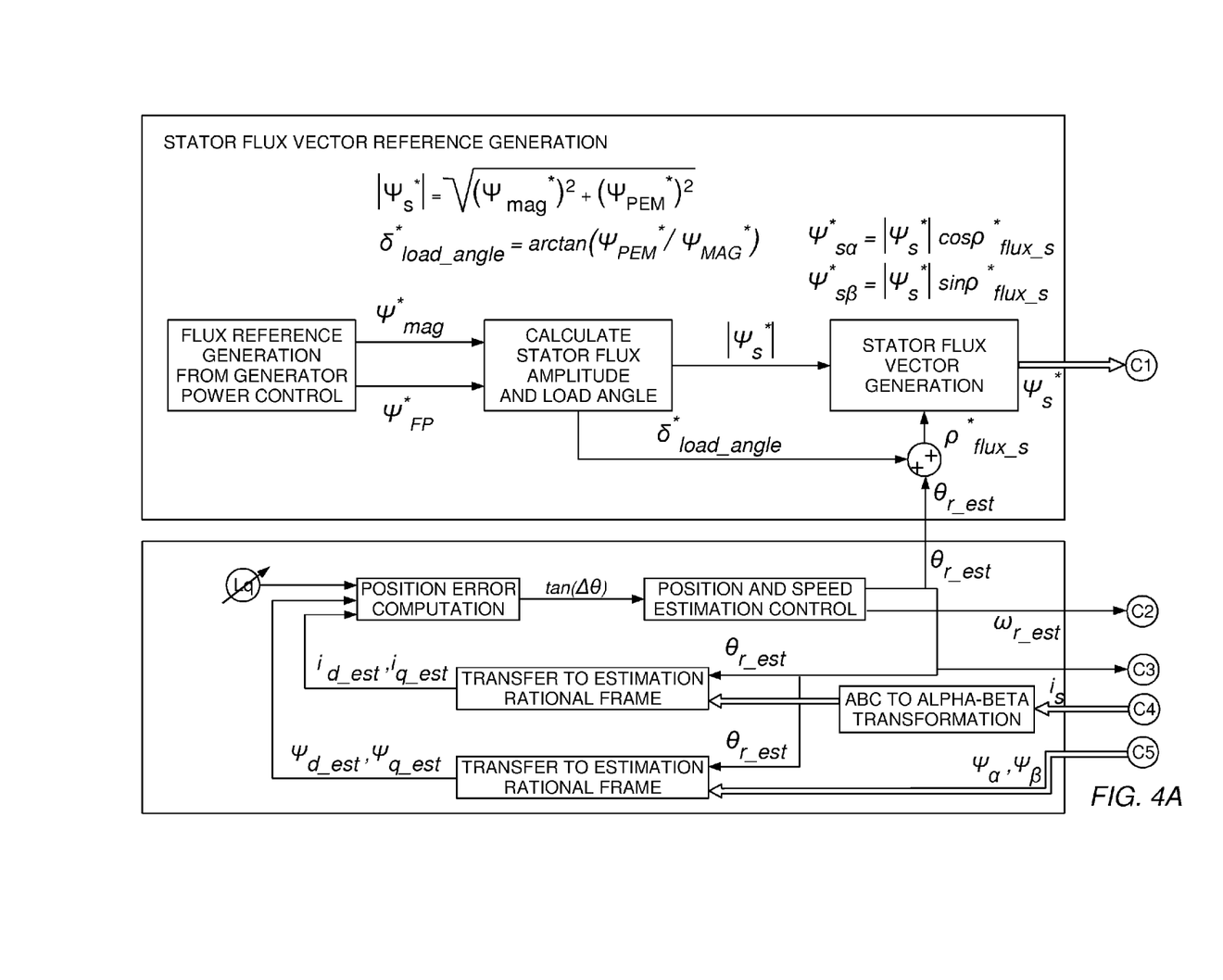
FIGS. 4A and 4B illustrate a sensorless position control scheme applied in a stator flux vector control system.
Figure 4B:
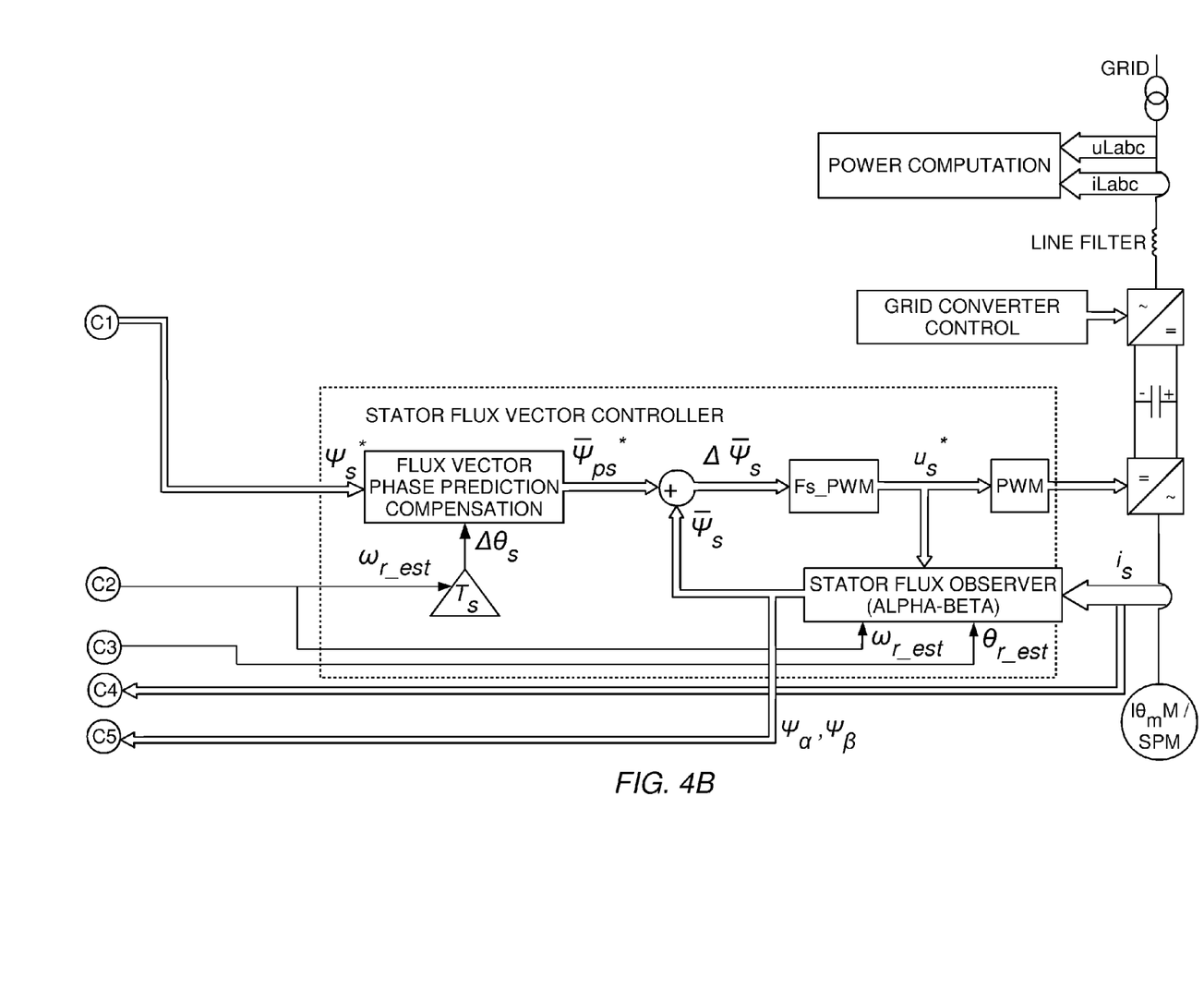

FIGS. 4A and 4B illustrate the sensorless position control scheme in a stator flux vector control system.

Figure 5:
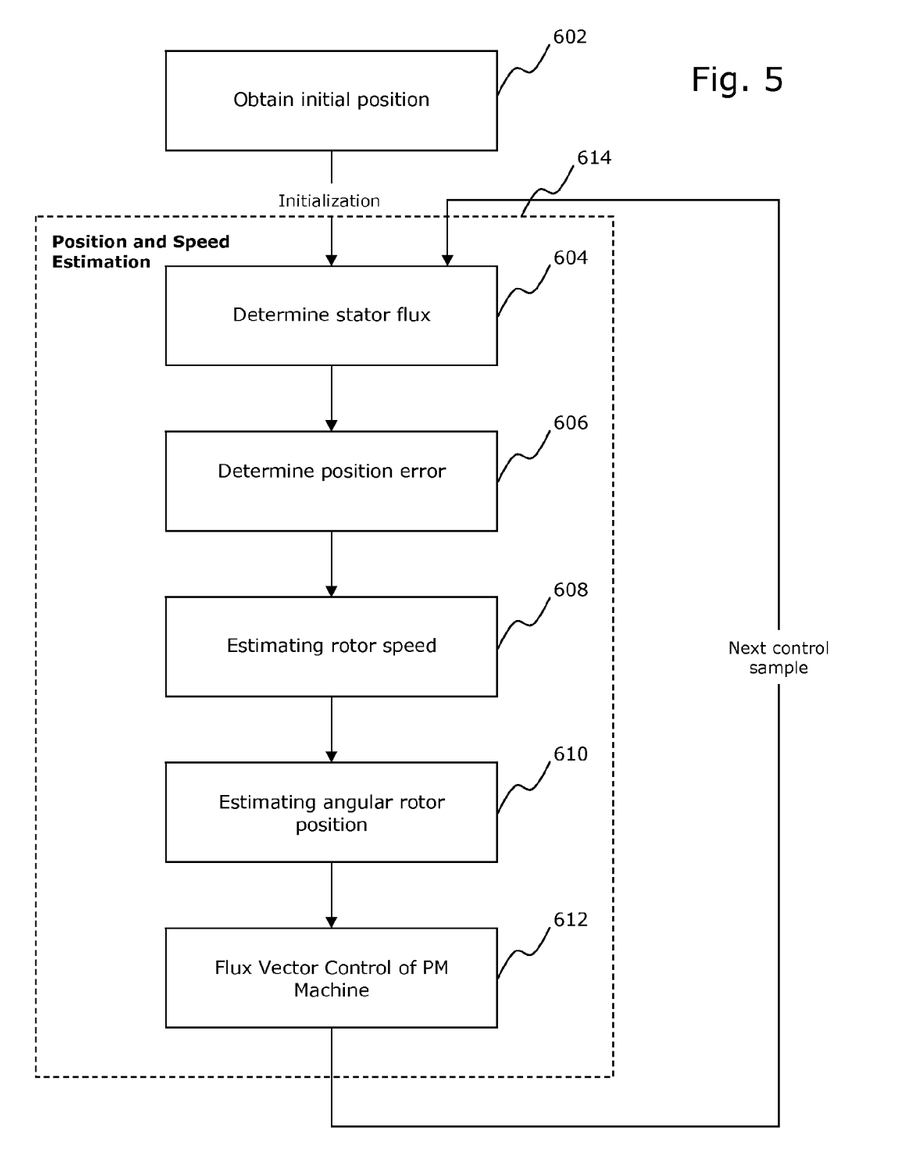
FIG. 5 shows a flow chart for position sensorless control.

FIG. 5 shows a flow chart for a position sensorless control system. In 602, the initial position measurement is obtained and provided as an initialization of the control system. In the present embodiment, the initial position is obtained from a stator line voltage measurement, in particular, the measurement of stator Bemf voltage at a generator open circuit condition, also known as a power connection stage when PWM control of the generator is enabled. Alternatively, the initial position may be obtained from an encoder measurement, prior to an encoder fault.

In 604, the stator flux is determined. In this case, a stator current is measured in a natural abc coordinate frame and then transformed into the stationary α-β frame. Stator flux observation is then carried out in the α-β reference frame. In particular, a current mode flux observer and a voltage mode flux observer are used in the present embodiment. A weighted combination of the current mode stator flux and the voltage mode stator flux is carried out, based on an estimated rotor speed.

In 606, the position error is determined, based on at least the stator flux and the stator current. The stator flux obtained from weighted combination is further transformed to a rotor flux frame. The stator current is similarly transformed. A q-axis inductance profile of the stator is thereafter obtained from a look-up table and a position error function is computed.

To reduce the steady state position error, a speed-dependent position error compensation angle is determined and combined with the computed position error function. A total position error function is thereby obtained.

In 608, the generator rotor speed is obtained based on proportional-integral (PI) regulation of position error signal with appropriate speed feed forward compensation. In this embodiment, the following steps are taken:

PI regulation of position error function to get the estimated speed error signal Obtain a speed feed forward signal by low pass filtering (LPF_1) of the speed signal applied in the generator control of previous control sample Obtain the estimated raw speed signal by summing up the estimated speed error signal and speed feed forward signal.

In 610, the estimated rotor angular position is obtained by an integration of the estimated raw speed signal with appropriate position initialization.

Further, the speed ripple is reduced by low pass filtering (LPF_2) before applying it in control. A speed transition feature is further provided to allow the smooth transition of the generator rotor to the estimated speed, with respect to the initial speed.

In 612, the estimated position and speed signal are applied in the flux vector control system of the electrical machine. The sensorless control system thereafter returns to block 604 to determine the next control sample. It may also be noted that blocks 604 to 612 comprise position and speed estimate function block 614.

While the invention has been illustrated by a description of various embodiments and while these embodiments have been described in considerable detail, it is not the intention of the applicant to restrict or in any way limit the scope of the appended claims to such detail.

Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method for sensorless position control of an electrical machine, the method comprising:
measuring a stator current of the electrical machine;
determining a stator flux of the electrical machine from the stator current;
computing a total rotor position error from at least the stator flux and the stator current;
determining an estimated raw speed signal from the total rotor position error;
integrating the raw speed signal so as to derive an estimated angular rotor position of a rotor of the electrical machine; and
applying the estimated angular rotor position to a controller comprising a processor which, in operation, controls the electrical machine responsive to the estimated angular rotor position.

2. The method of claim 1, further comprising:
low-pass filtering the raw speed signal in order to reduce ripple.

3. The method of claim 2, wherein the filtered speed signal and the estimated angular rotor position are applied in a control algorithm for controlling the electrical machine.

4. The method of claim 1, wherein the electrical machine comprises an interior permanent magnet machine.

5. The method of claim 1, wherein the electrical machine comprises a surface mounted permanent magnet machine.

6. The method of claim 1, wherein the electrical machine comprises a reluctance machine.

7. The method of claim 1, wherein the electrical machine comprises an electrical generator.

8. The method of claim 1, wherein computing the total rotor position error comprises:
   computing a stator flux-related position error, and a stator current-related position error,
   deriving a speed-dependent offset compensation angle for the position error, and
   computing the total rotor position error from the stator flux-related position error, the stator current-related position error and the speed-dependent offset compensation angle.

9. The method of claim 8, wherein the speed-dependent offset compensation angle is correlated to a range of machine speed settings, from an angle of zero at a low speed level, to a predetermined compensation angle at a high speed level.

10. The method of claim 1, wherein determining the estimated raw speed signal comprises:
    applying a proportional-integral (PI) regulator to the total rotor position error so as to derive a speed error, and
    low-pass filtering a transition speed signal so as to derive a speed feed forward signal.

11. The method of claim 10, wherein the transition speed signal is obtained during an initialization as an initial iteration.

12. The method of claim 11, wherein the initialization comprises obtaining an initial rotor speed from any of a measurement of stator voltage at an open circuit condition, and an encoder measurement prior to an encoder fault.

13. The method of claim 12, wherein the initialization further comprises obtaining an initial rotor position.

14. The method of claim 1, wherein a stator inductance is identified and applied to the computing of the total rotor position error.

15. The method of claim 14, wherein the stator inductance is identified with a 2-dimensional look-up table based on the stator flux and the stator current.

16. The method of claim 1, wherein determining the stator flux comprises:
    determining a stator flux from a current mode flux observer,
    determining a stator flux from a voltage mode flux observer, and
    combining the stator flux from the current mode flux observer with the stator flux from the voltage mode flux observer based on a machine rotor speed.

17. A wind turbine comprising:
an electrical machine; and
an apparatus for sensorless position control of the electrical machine, the apparatus being adapted to carry out an operation comprising:
   measuring a stator current of the electrical machine;
   determining a stator flux of the electrical machine from the stator current;
   computing a total rotor position error from at least the stator flux and the stator current;
   determining an estimated raw speed signal from the total rotor position error;
   integrating the raw speed signal so as to derive an estimated angular rotor position of a rotor of the electrical machine; and
   controlling the electrical machine responsive to the estimated angular rotor position.

18. A computer-readable medium having a computer program recorded thereon, the computer program comprising instructions which, when executed by a processor, cause the processor perform an operation for sensorless position control of an electrical machine in a wind turbine, the operation comprising:
   measuring a stator current of the electrical machine;
   determining a stator flux of the electrical machine from the stator current;
   computing a total rotor position error from at least the stator flux and the stator current;
   determining an estimated raw speed signal from the total rotor position error;
   integrating the raw speed signal so as to derive an estimated angular rotor position of a rotor of the electrical machine; and
   controlling the electrical machine responsive to the estimated angular rotor position.

* * * * *